(12) United States Patent
Asaad et al.

(10) Patent No.: US 8,737,233 B2
(45) Date of Patent: May 27, 2014

(54) INCREASING THROUGHPUT OF MULTIPLEXED ELECTRICAL BUS IN PIPE-LINED ARCHITECTURE

(75) Inventors: Sameh Asaad, Briarcliff Manor, NY (US); Bernard V. Brezzo, Somers, NY (US); Mohit Kapur, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 13/236,109

(22) Filed: Sep. 19, 2011

(65) Prior Publication Data
US 2013/0070606 A1    Mar. 21, 2013

(51) Int. Cl.
*H04L 12/26* (2006.01)
*H04L 12/28* (2006.01)
*H04L 12/16* (2006.01)
*H04L 12/66* (2006.01)

(52) U.S. Cl.
CPC ............. *H04L 12/2602* (2013.01); *H04L 12/26* (2013.01); *H04L 12/28* (2013.01); *H04L 12/66* (2013.01)
USPC .......................................................... 370/241

(58) Field of Classification Search
CPC .......... H04J 3/14; H04W 24/00; H04L 43/00; H04B 17/00
See application file for complete search history.

(56) References Cited

U.S. PATENT DOCUMENTS

| | | | |
|---|---|---|---|
| 5,006,980 A * | 4/1991 | Sanders et al. ................. | 712/219 |
| 5,875,312 A * | 2/1999 | Walsh et al. ................... | 710/303 |
| 6,130,891 A | 10/2000 | Lam et al. | |
| 6,493,784 B1 * | 12/2002 | Kamimura et al. ........... | 710/309 |
| 6,629,296 B1 | 9/2003 | Ganesan et al. | |
| 7,113,505 B2 | 9/2006 | Williams | |
| 7,743,191 B1 * | 6/2010 | Liao .............................. | 710/240 |
| 7,937,568 B2 * | 5/2011 | Correale et al. .............. | 712/221 |
| 2002/0126274 A1 * | 9/2002 | Minneman et al. ........... | 356/225 |
| 2005/0117633 A1 * | 6/2005 | Schmidt ........................ | 375/219 |
| 2006/0117274 A1 | 6/2006 | Tseng et al. | |
| 2007/0002845 A1 * | 1/2007 | Kelly et al. ................... | 370/354 |
| 2007/0030862 A1 | 2/2007 | Michels | |
| 2007/0129926 A1 | 6/2007 | Verheyen et al. | |
| 2007/0164883 A1 * | 7/2007 | Furtner ......................... | 341/126 |
| 2007/0198959 A1 | 8/2007 | Schubert et al. | |
| 2009/0019265 A1 * | 1/2009 | Correale et al. .............. | 712/216 |
| 2009/0193172 A1 * | 7/2009 | Brunot ......................... | 710/317 |
| 2009/0319253 A1 * | 12/2009 | Phillips et al. ................. | 703/16 |
| 2011/0055509 A1 * | 3/2011 | Ware et al. .................... | 711/167 |

FOREIGN PATENT DOCUMENTS

JP          5089026 A      4/1993

* cited by examiner

*Primary Examiner* — Hassan Phillips
*Assistant Examiner* — Prenell Jones
(74) *Attorney, Agent, or Firm* — Anne V. Dougherty; William E. Lewis (57) ABSTRACT

Techniques are disclosed for increasing the throughput of a multiplexed electrical bus by exploiting available pipeline stages of a computer or other system. For example, a method for increasing a throughput of an electrical bus that connects at least two devices in a system comprises introducing at least one signal hold stage in a signal-receiving one of the two devices, such that a maximum frequency at which the two devices are operated is not limited by a number of cycles of an operating frequency of the electrical bus needed for a signal to propagate from a signal-transmitting one of the two devices to the signal-receiving one of the two devices. Preferably, the signal hold stage introduced in the signal-receiving one of the two devices is a pipeline stage re-allocated from the signal-transmitting one of the two devices.

15 Claims, 6 Drawing Sheets

FIG. 2

PCB 100

INCREASING THROUGHPUT OF MULTIPLEXED ELECTRICAL BUS IN PIPE-LINED ARCHITECTURE

STATEMENT REGARDING FEDERALLY SPONSORED RESEARCH

This invention was made with Government support under Contract No.: B554331 awarded by the Department of Energy. The Government has certain rights in this invention.

FIELD OF THE INVENTION

The present invention relates generally to system design and, more particularly, to techniques for increasing the throughput of a multiplexed electrical bus by exploiting available pipeline stages of such designed systems.

BACKGROUND OF THE INVENTION

Existing systems such as computer systems are known to employ relatively wide electrical buses for carrying address, data and various control signals to and from a multitude of devices. For example, these electrical buses serve to couple two or more integrated circuits (chips) in a computer or other system. There can be thousands of signals traversing between chips. Wiring massive amounts of signal connections across various chips and printed circuit boards can cause system cost to significantly escalate.

To limit this wiring or cabling cost, and also the number of chip inputs/outputs (I/O), it has become common practice to multiplex signals across electrical buses. As is known, multiplexing is a signal processing method by which multiple signals are combined into one signal over a shared medium, e.g., wire. Multiplexing reduces the number of wires or cables that need to be routed.

SUMMARY OF THE INVENTION

Illustrative embodiments of the invention provide techniques for increasing the throughput of a multiplexed electrical bus by exploiting available pipeline stages of a system.

For example, in one embodiment of the invention, a method for increasing a throughput of an electrical bus that connects at least two devices in a system comprises the step of introducing at least one signal hold stage in a signal-receiving one of the two devices, such that a maximum frequency at which the two devices are operated is not limited by a number of cycles of an operating frequency of the electrical bus needed for a signal to propagate from a signal-transmitting one of the two devices to the signal-receiving one of the two devices. Each of the two devices comprises a pipelined architecture with one or more pipeline stages for buffering signals, and the signal-transmitting one of the two devices comprises a multiplexer for multiplexing buffered signals from at least one pipeline stage to generate a multiplexed signal that is propagated over the electrical bus, and the signal-receiving one of the two devices comprises a de-multiplexer for de-multiplexing the multiplexed signal received over the electrical bus. Preferably, the at least one signal hold stage introduced in the signal-receiving one of the two devices is a pipeline stage re-allocated from the signal-transmitting one of the two devices.

In another embodiment, given that an operating frequency of the two devices is a function of an operating frequency of the electrical bus divided by a total latency value, and wherein each of the two devices comprises a pipelined architecture with one or more pipeline stages for buffering signals, and the signal-transmitting one of the two devices comprises a multiplexer for multiplexing buffered signals from at least one pipeline stage to generate a multiplexed signal that is propagated over the electrical bus, and the signal-receiving one of the two devices comprises a de-multiplexer for de-multiplexing the multiplexed signal received over the electrical bus, a method for increasing a throughput of the electrical bus that connects the two devices comprises the following steps. At least one pipeline stage is removed from the signal-transmitting one of the two devices, and at least one signal hold stage is added in a signal-receiving one of the two devices, such that the operating frequency of the two devices is increased, the total latency value is decreased, and a cycle-accuracy is maintained between the two devices with respect to a state prior to the removal and addition steps and a state after the removal and addition steps.

Advantageously, by exploiting the pipeline stages of the system as described herein, techniques of the invention are able to effectively mask the latency associated with the multiplexer/de-multiplexer link. Techniques of the invention may be implemented in a variety of computer and other systems.

These and other features, objects and advantages of the present invention will become apparent from the following detailed description of illustrative embodiments thereof, which is to be read in connection with the accompanying drawings.

DETAILED DESCRIPTION OF THE INVENTION

Illustrative embodiments of the invention will be described herein in the context of one or more illustrative integrated circuit and electrical bus architectures. However, it is to be understood that principles of the invention are not limited to the specific architectures described herein.

As mentioned above, it is known that computer and other systems typically employ electrical buses for carrying various types of signals (e.g., address signals, data signals, and control signals) between a large number of devices, e.g., integrated circuits (chips). For example, as shown on the printed circuit board (PCB) 100 in FIG. 1, there can be thousands of signals traversing between chip 102 and chip 112 via electrical bus 120. These signals (1, 2, . . . P) can originate in pipeline stages (e.g., 104-1, 104-2) of one chip (e.g., 102) and be transmitted across the bus 120 to pipeline stages (e.g., 114-1, 114-2) of another chip (e.g., 112). Such wiring of large amounts of signals across various chips, and even across PCBs, can cause the system cost to significantly increase.

Figure 1:
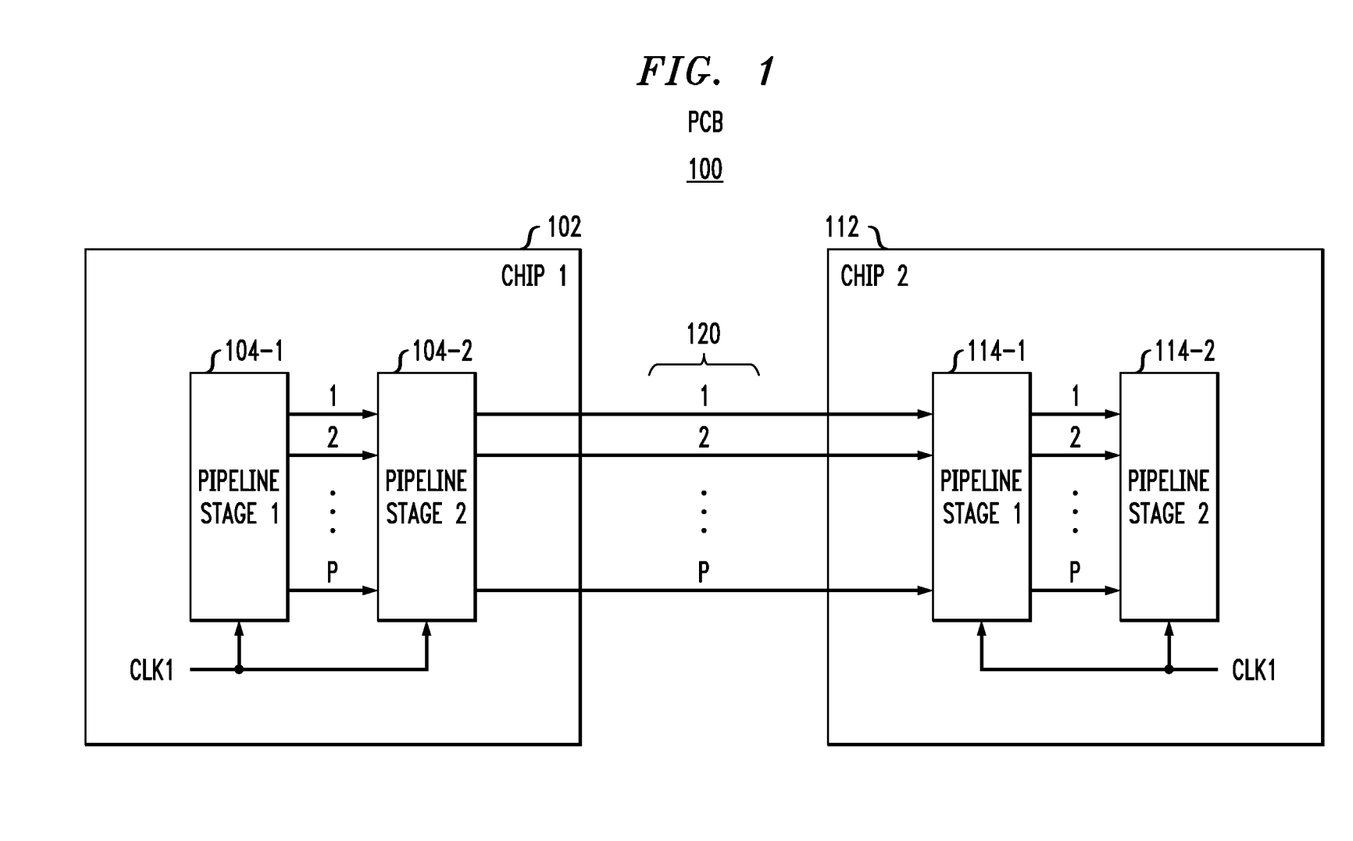
FIG. 1 illustrates a printed circuit board with two pipelined devices communicating via an electrical bus.

As is known in the art of computing, a "pipeline" is a set of data processing elements or stages connected in series, such that the output of one stage is the input of the next stage. As is further known, each stage of a pipeline may typically include latches (e.g., flip-flops) which act as buffers to boost the signal strength on long wires, as well as re-time the data with respect to the clock that controls the pipeline, thus reducing the skew between various data lines in a wide bus. For example, as shown in FIG. 1, the timing of the various pipeline stages is controlled by clock CLK1.

Figure 2:
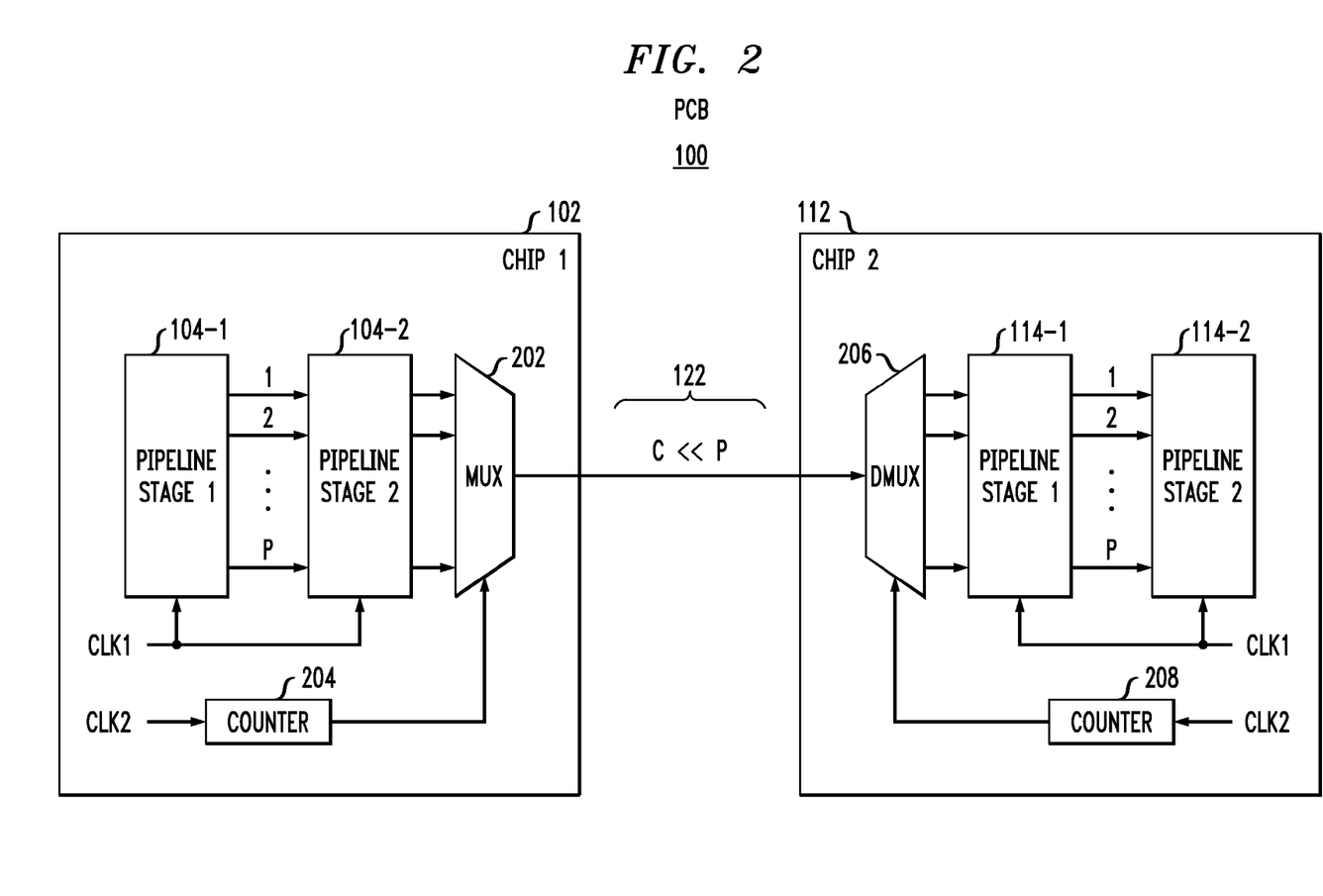
FIG. 2 illustrates a printed circuit board with two pipelined devices communicating via an electrical bus whereby signals are multiplexed on the electrical bus.

As further mentioned above, to limit this wiring or cabling cost, and also the number of chip I/O, signal multiplexing techniques can be employed. Thus, in the example of chip 102 and chip 112 on PCB 100, FIG. 2 shows the inclusion of a multiplexer (MUX) 202 controlled by a counter 204 and CLK2 in chip 102, and a de-multiplexer (DEMUX) 206 controlled by a counter 208 and CLK2.

MUX 202 multiplexes the P signals from pipeline stage 104-2 onto C wires (where C<<P). By way of example, this may be done by assigning the P signals to multiple time slots associated with each of the C wires, which is known as time division multiplexing. Other forms of multiplexing may be employed.

Note that by using the multiple time slots, in this example, across each of the C wires of bus 122, all P signals are transmitted from chip 102 to chip 112. Advantageously, however, bus 122 is significantly smaller (less wires) than bus 120 (i.e., bus 120 in FIG. 1 has P wires to accommodate the P signals). In chip 112, DEMUX 206 de-multiplexes the C received signals to obtain all P signals, which are provided to the pipeline stages of chip 112. While multiplexing reduces the number of wires or cables that need to be routed between chips, the multiplexed signals must typically propagate at a higher frequency to prevent degradation in system performance.

It is realized that an area where multiplexing of the signals across various devices becomes desirable is that of field programmable gate array (FPGA) based hardware accelerators. As system-on-chip (SoC) and multiprocessor units on a single chip are becoming a common practice, simulating these complex chips is becoming a necessary, but expensive, challenge. One of the techniques adopted in simulating these complex systems is to employ an FPGA based hardware accelerator.

FPGA based hardware accelerators work on the principle of dividing the chip (device under test or DUT) design into small functional blocks. These blocks are then implemented on various FPGAs. These FPGAs are inter-connected to each other in the same fashion as the DUT. The chip or DUT simulations can now be run on this specialized FPGA hardware instead of running them on a conventional simulator. Conventional simulators are written completely in software and run on a general purpose computer. FPGA based hardware simulators can typically give a speed advantage of about 100 to about 1000 fold over conventional simulators.

One design challenge which arises in building FPGA based hardware accelerators is cycle accuracy. The FPGA based hardware should exactly match cycle-by-cycle behavior of the DUT. This means that, for example, if the DUT was simulated on a software simulator or the DUT is built into a single chip, at any given clock cycle, all three systems—hardware accelerator, software simulator and the DUT chip—should exhibit exactly the same state. This becomes a significant challenge as the DUT design is now partitioned over multiple FPGAs communicating with one another. Because of pin limitations on FPGAs, the signals between FPGAs have to be multiplexed. However, multiplexing and de-multiplexing consumes clock cycles. Thus, to keep cycle accuracy, these multiplexers have to run at a much higher frequency than DUT blocks. No additional latency can be introduced in the system, as it will cause deviation from cycle-accurate behavior.

To illustrate the relationship between multiplex ratio and bandwidth, let us consider the following example.

Let C be the number of wires available for routing on a printed circuit board (PCB), this is usually decided by the system cost and/or the limit on the number of chip I/O pins. Let Ft be the maximum frequency at which these C wires can be operated. Ft is limited by several factors such as, for example, the quality of printed circuit board material, transmitter/receiver design, packaging, cross-talk between wires, and inter symbol interference.

Let P be the number of functional signals that need to be routed. This number usually comes from the computer bus architecture. Then, multiplex ratio M is defined as:

$$M=P/C$$

Let N be the number of Ft cycles required for the signal to propagate from chip1 (e.g., 102 in FIG. 2) to chip2 (e.g., 112 in FIG. 2). Note that chip1 and chip2 could each be an FPGA in accordance with one embodiment. This value N is comprised of flight time, and propagation delay in the chip output driver and the input receiver. N is also referred to as the latency of the link.

Therefore, the maximum frequency Fs at which any functional signal within the chip can be operated is given by:

$$Fs=Ft/(M+N+B)$$

where B represents the extra cycles required to compensate for clock (e.g., CLK1 in FIG. 2) phase differences between chip1 and chip2. These extra cycles can also be used to prevent any setup and hold violations that may arise because of any jitter riding on the clock.

Thus, it is realized that any effort to improve Fs without incurring the penalty of reducing multiplex ratio M or increasing signaling rate Ft will greatly improve system performance. Illustrative embodiments of the invention provide techniques to improve the throughput in systems which have high transmission latency (N).

Figure 3:
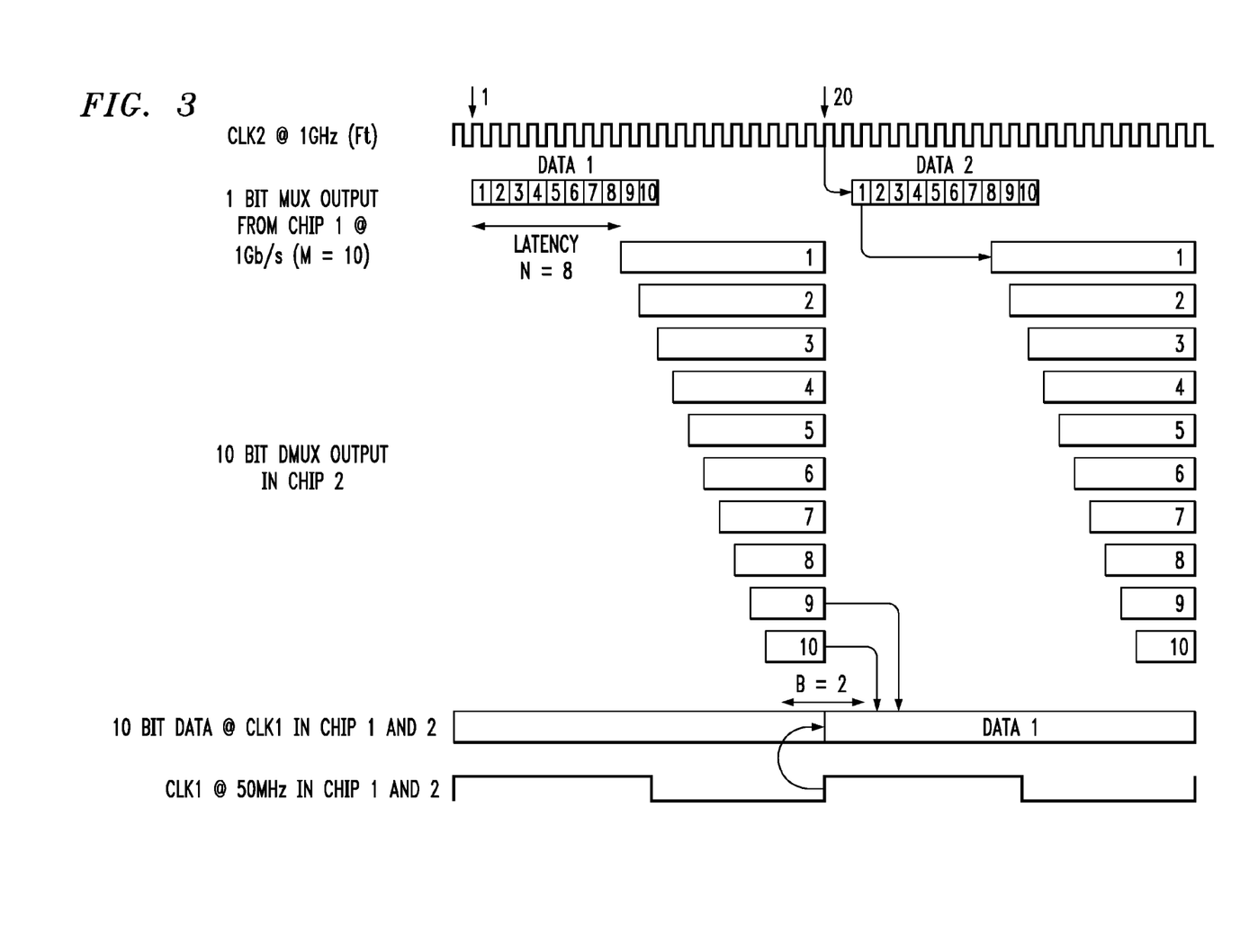
FIG. 3 illustrates timing diagrams associated with the two pipelined devices of FIG. 2.

With reference now to the timing diagrams of FIG. 3, and without any loss of generality, assume there are ten signals traveling from chip 102 (chip1) to chip 112 (chip2). Thus:

$$P=10$$

Let the maximum allowed wires that can be routed on the printed circuit board be one. Let the maximum frequency at which this link can be operated be 1 GHz. Thus:

$$C=1, Ft=1 \text{ GHz}$$

Therefore, the multiplex ratio is:

$$M=10/1=10$$

Let the latency of the link including the transmitter in chip1 to the receiver in chip2 be eight cycles of Ft. Let the number of buffer cycles to re-latch the data in chip2 be two. Thus:

$$N=8, B=2$$

Therefore, the maximum frequency at which chip1 and chip2 can operate is:

$$Fs=1 \text{ GHz}/(10+8+2)=50 \text{ MHz}$$

Note that for the pipeline architecture in FIG. 1 to be cycle accurate with the pipeline architecture in FIG. 2, data launched by an active edge in chip1 (102) should be captured by the following active edge in chip2 (112). As shown in FIG. 3 (in the waveform at the top of the figure), the second positive clock edge of CLK1 (labeled 1) in chip2 should be able to capture data launched by the first positive clock edge of CLK1 in chip1. In the present example, this requirement limits the frequency of CLK1 to Fs/20, as illustrated by the equation above.

Now referring back to FIG. 1, recall that chip 1 and chip 2 each have multiple pipeline stages, each of which include one or more latches which act as buffers to boost the signal strength on long wires, as well as re-time the data with respect to the clock, thus reducing the skew between various data lines in a wide bus. In this scenario, since the data does not get manipulated but only gets reproduced after every pipeline stage, illustrative principles of the invention realize that this property can advantageously be used to hide the latency of the link. The inventive concept is illustratively depicted in FIG. 4.

Figure 4:
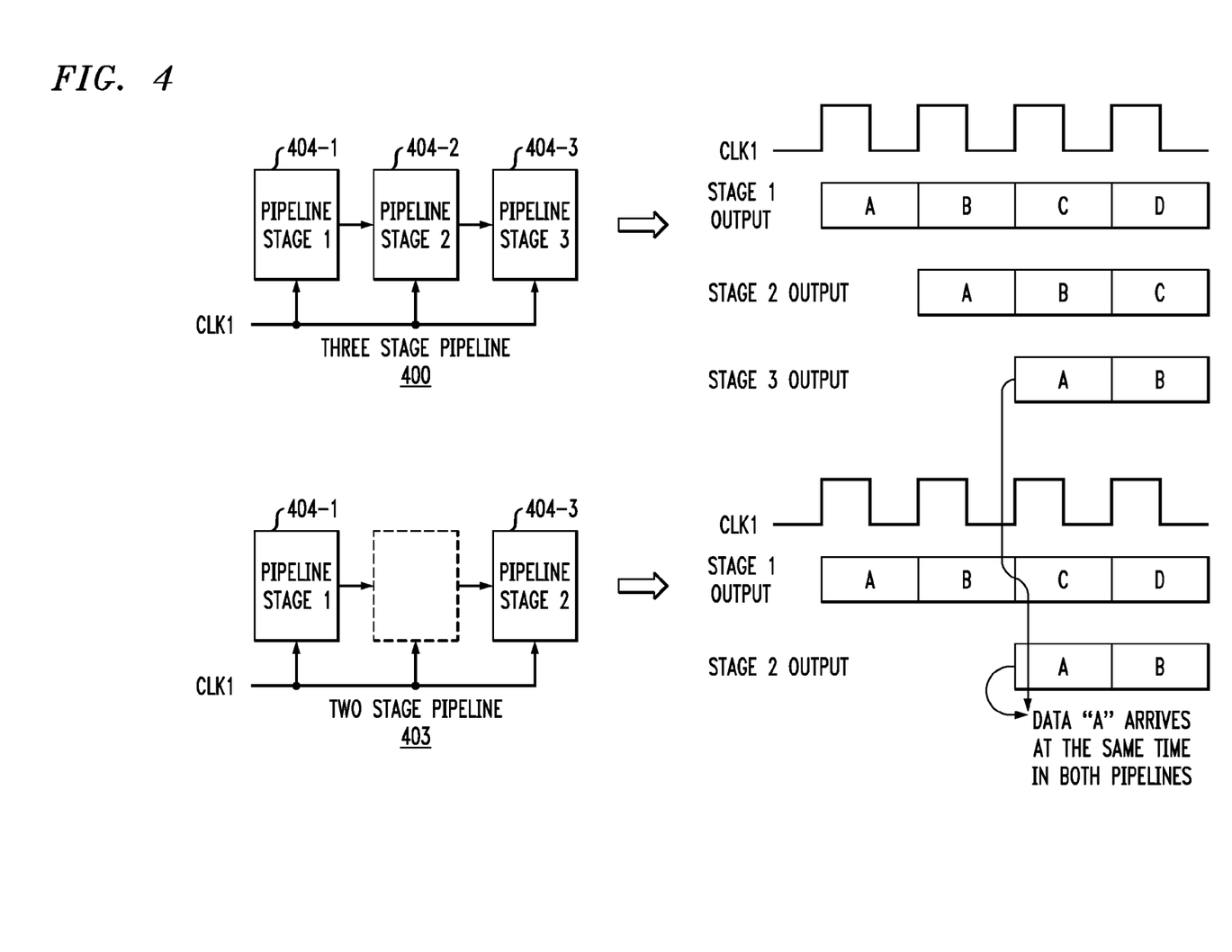
FIG. 4 illustrates timing diagrams for understanding the exploitation of available pipeline stages in accordance with one embodiment of the invention.

In other words, if we convert the three stage pipeline 400 of FIG. 4 (comprised of pipeline stages 404-1, 404-2, and 404-3) to a two stage pipeline 403 (404-1 and 404-3, as shown below the threes stage pipeline in FIG. 4) and still operate the new two stage pipeline at clock rate CLK1, we will have an extra cycle of CLK1 to spend. This extra clock cycle is available because the two stage pipeline circuit 403 must have cycle accurate behavior compared to the three stage pipeline circuit 400. Advantageously, this extra available clock cycle can be used to hide the latency of the link (N, as described above).

Thus, using this concept, the pipeline stages in chip1 and chip2 of FIG. 2 can be used to hide the latency of the link. In other words, data launched from the rising edge of pipeline stage 1 (104-1) in chip 1 has two clock cycles to reach the output of pipeline stage 1 (114-1) in chip2. Thus, it is realized that in accordance with illustrative principles of the invention, the time spent in moving the data across pipeline stage 2 (104-2) in chip1 could be used in hiding the latency of the link.

Figure 5:
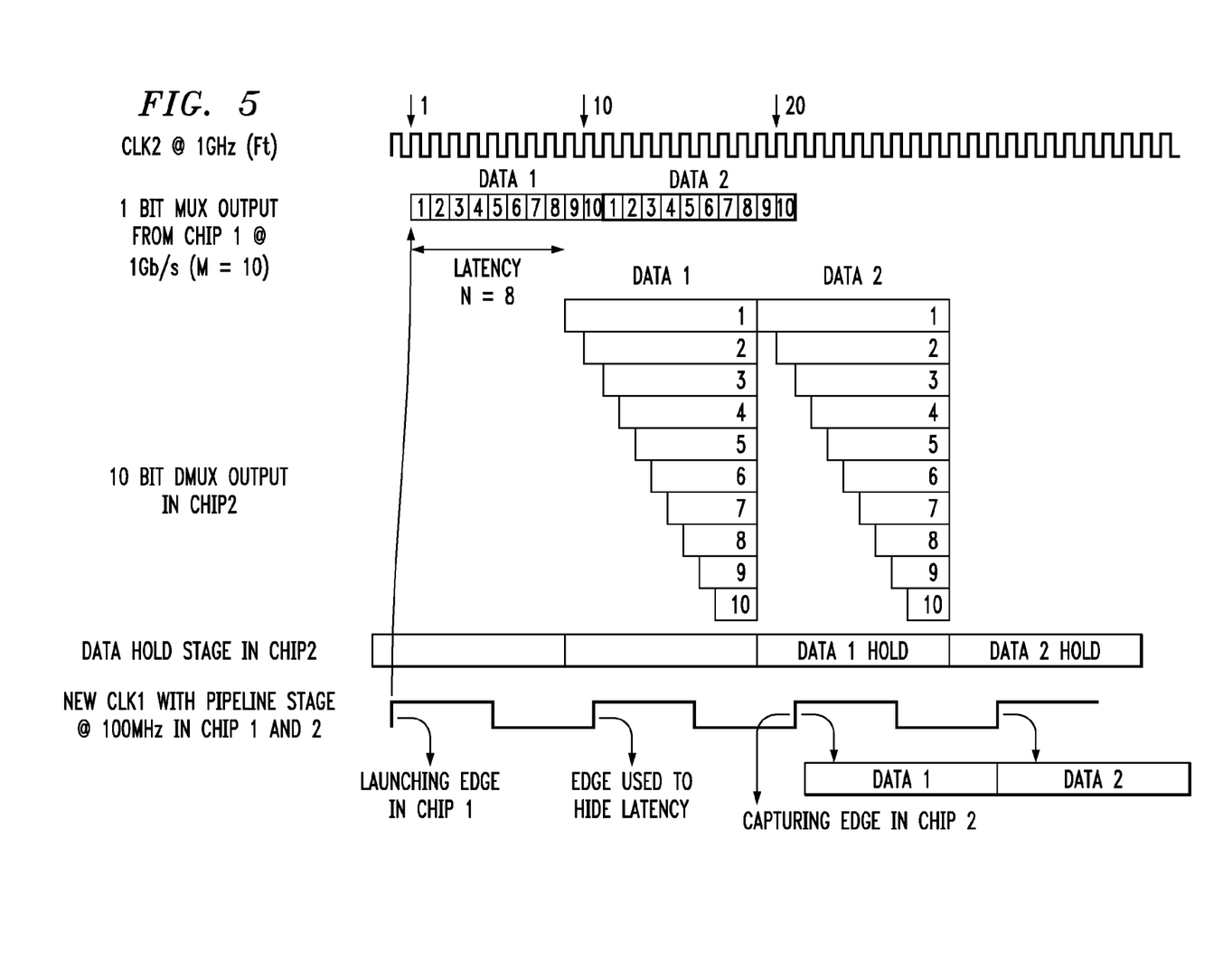
FIG. 5 illustrates further timing diagrams for understanding the exploitation of available pipeline stages in accordance with one embodiment of the invention.

Thus, as illustrated in the timing diagrams of FIG. 5, the new equation for the system frequency Fs is:

$$Fs=Ft/M$$

as compared to $Fs=Ft/(M+N+B)$, as explained above, which is the equation for Ft without exploiting the available pipeline stages of the chip.

In our present example, Fs advantageously increases to 100 MHz from 50 MHz. This increase in the maximum frequency (Fs) at which any functional signal within the chip can be operated is achieved at no additional cost in terms of chip area. Thus, in an FPGA design scenario, the latches used in pipeline stage 1 of chip 1 are now used to create an intermediate storage to hold the data until the third clock edge of new CLK1 arrives. Note that, in FPGAs, as the blocks of the DUT are simply mapped to various FPGAs, one can easily move the pipeline stages from one FPGA to another by changing how the design is partitioned amongst various FPGAs.

Thus, as shown in FIG. 5, the "1 Bit MUX Output from Chip1" represents the waveform at the output of MUX 202 in FIG. 2, where 10 functional signals running at clock CLK1 are multiplexed onto a single line using clock CLK2. Thus, the state represented by "DATA1" at the input of the MUX is transferred to its output. As CLK1 can now be run at a higher rate, the next state, represented by "DATA2," is available after "DATA1" multiplexing is over. Comparing with "1 Bit MUX Output from Chip 1" in FIG. 3, the state "DATA2" could not be made available due to the total latency of the link represented by M+N+B in the equation $Fs=Ft/(M+N+B)$. The "10 Bit DEMUX Output in Chip 2" in FIG. 5 shows the various times of arrival of de-multiplexed "DATA1" and "DATA2." The data hold pipeline stage holds the de-multiplexed data long enough so as to keep the state of pipeline stage 1 (114-1) the same as that in FIG. 1 (without multiplexing). Thus, the new clock frequency Fs at which CLK1 can be operated will capture the output of the data hold stage and reproduce it at the output of pipeline stage 114-1 of FIG. 2.

Figure 6:
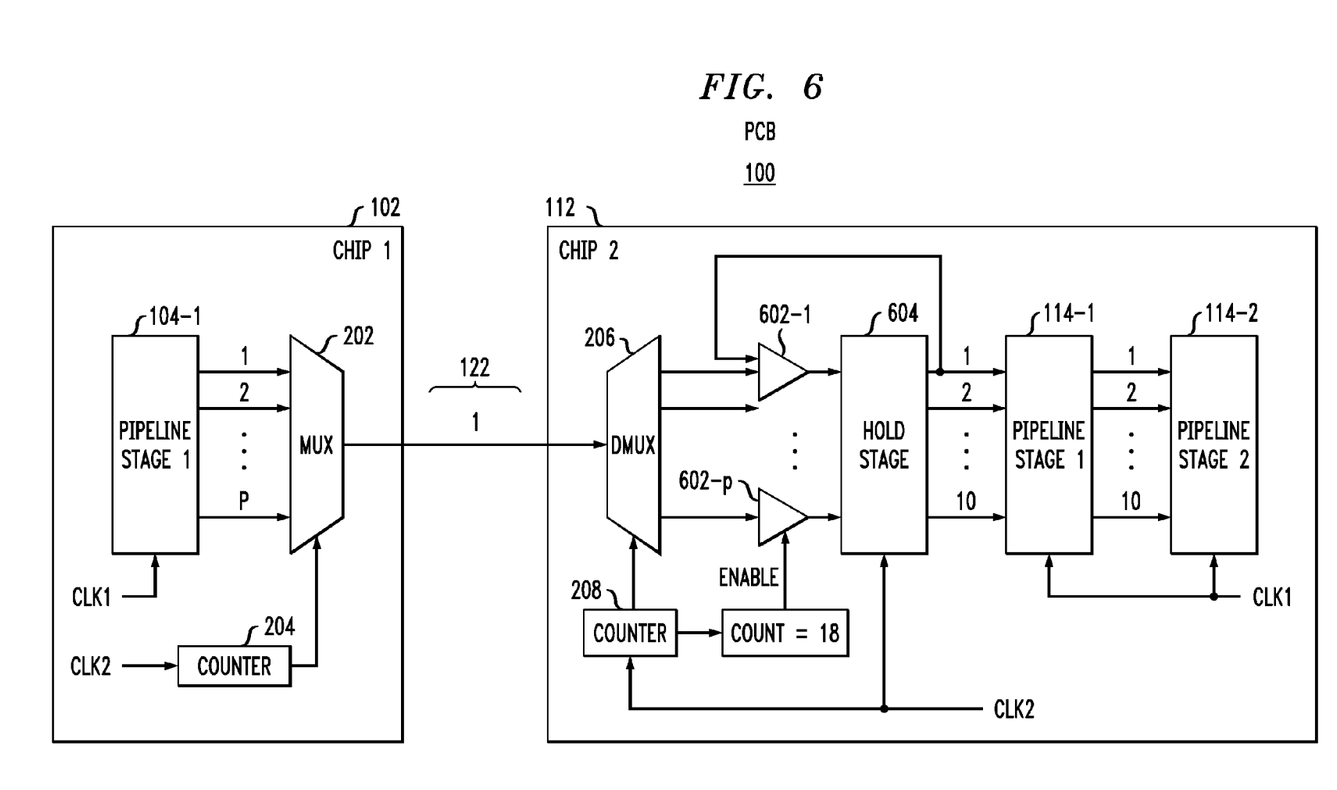
FIG. 6 illustrates a printed circuit board with two pipelined devices communicating via an electrical bus that exploits available pipeline stages in accordance with one embodiment of the invention.

FIG. 6 represents a modified design of FIG. 2, for the example case given above, with pipeline stage 2 (104-2) removed from chip 1 (102). A data hold stage (or, more generally, a signal hold stage) is added in chip 2. The data hold stage comprises enable logic gates 602-1 through 602-P, and hold latch 604. For the present example of M=10, the data hold stage is enabled when the counter 208 reaches a count of 18. The counter 204 in chip 1 wraps around after counting to ten. The counter 208 in chip 2 wraps around after counting to twenty. Counters 204 and 208 generate select lines for MUX 202 and DEMUX 206, respectively.

Advantageously, as explained above in detail, illustrative embodiments of the invention increase the throughput of a multiplexed pipelined bus by using the time spent in a pipeline stage to compensate for the latency of the link. Also, illustrative FPGA embodiments of the invention move the physical position of a pipeline stage in a circuit to improve the throughput of the link. That is, in the present example, stage 2 in chip 1 is removed and a data hold stage is formed in chip 2. Thus, advantageously, the number of latches in the overall pipeline (including pipeline stages of chip 1 and chip 2) remains the same but the frequency at which they operate changes.

Further, illustrative embodiments of the invention improve the throughput of a link without incurring an extra penalty of latency. Still further, illustrative embodiments of the invention improve the operating speed of a cycle-accurate FPGA based hardware accelerator, by using the time spent in pipeline stages of the device under test to compensate for the latency of the link.

Note that the multiplexer/de-multiplexer combination shown in FIG. 6 may be considered a serializer/deserializer (SerDes) which is a pair of functional blocks commonly used in high speed communications to compensate for limited input/output. These blocks convert data between serial data and parallel interfaces in each direction. Thus, illustrative principles of the invention as applied to an FPGA implementation, as described herein, serve to increase the DUT operating frequency of the FPGA based hardware accelerator by hiding (i.e., masking or compensating for) the latency of the inter-FPGA SerDes links.

It is to be noted that, while the term "chip" is used in the figures to describe the respective devices that are communicating with each other over the multiplexed electrical bus, the above examples are described in the context of an FPGA based hardware accelerator implementation. That is, as mentioned above, in FPGAs, one can easily allocate pipeline stages from one FPGA, and thus, one stage in the multiplexing side of the overall pipeline can be assigned to the data hold stage of the de-multiplexing side of the overall pipeline. However, the pipeline exploitation techniques of the invention can be applied to system design. For example, one could be designing a computing system where a processor chip communicates with a memory controller chip, which then communicates to some memory chip. In the process of designing the processor chip and the memory controller chip, one could move the pipeline stages to account for multiplexing latency in accordance with illustrative embodiments of the invention. This analysis can be done before the chips are manufactured. Another scenario in which the pipeline exploitation techniques of the invention can be applied is a design of a chip itself. That is, the devices that are communicating via a multiplexed electrical bus in this scenario are two circuit elements on the chip itself.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for increasing a throughput of an electrical bus that connects at least two devices in a system, comprising:
    introducing at least one signal hold stage in a signal-receiving one of the two devices, such that a maximum frequency at which the two devices are operated is not limited by a number of cycles of an operating frequency of the electrical bus needed for a signal to propagate from a signal-transmitting one of the two devices to the signal-receiving one of the two devices;
    wherein each of the two devices comprises a pipelined architecture with one or more pipeline stages for buffering signals, and the signal-transmitting one of the two devices comprises a multiplexer for multiplexing buffered signals from at least one pipeline stage to generate a multiplexed signal that is propagated over the electrical bus, and the signal-receiving one of the two devices comprises a de-multiplexer for de-multiplexing the multiplexed signal received over the electrical bus.

2. The method of claim 1, wherein the number of cycles of an operating frequency of the electrical bus needed for a signal to propagate from a signal-transmitting one of the two devices to the signal-receiving one of the two devices represents a link latency value.

3. The method of claim 2, wherein the at least one signal hold stage introduced in the signal-receiving one of the two devices is a pipeline stage re-allocated from the signal-transmitting one of the two devices.

4. The method of claim 3, wherein re-allocation of the pipeline stage from the signal-transmitting one of the two devices to the signal hold stage of the signal-receiving one of the two devices compensates for the link latency value.

5. The method of claim 1, wherein the system is a field programmable gate array (FPGA) based hardware accelerator that simulates a device under test (DUT), and wherein the two devices are FPGAs which each simulate one or more functions of the DUT.

6. The method of claim 1, wherein the system is a computer system, and wherein the two devices are integrated circuits on at least one printed circuit board of the computer system.

7. The method of claim 1, wherein the system is an integrated circuit, and wherein the two devices are circuit elements of the integrated circuit.

8. A method for increasing a throughput of an electrical bus that connects at least two devices in a system, wherein an operating frequency of the two devices is a function of an operating frequency of the electrical bus divided by a total latency value, and wherein each of the two devices comprises a pipelined architecture with one or more pipeline stages for buffering signals, and the signal-transmitting one of the two devices comprises a multiplexer for multiplexing buffered signals from at least one pipeline stage to generate a multiplexed signal that is propagated over the electrical bus, and the signal-receiving one of the two devices comprises a de-multiplexer for de-multiplexing the multiplexed signal received over the electrical bus, the method comprising:
    removing at least one pipeline stage from the signal-transmitting one of the two devices; and
    adding at least one signal hold stage in a signal-receiving one of the two devices, such that the operating frequency of the two devices is increased, the total latency value is decreased, and a cycle-accuracy is maintained between the two devices with respect to state prior to the removal and addition steps and a state after the removal and addition steps.

9. The method of claim 8, wherein the system is a field programmable gate array (FPGA) based hardware accelerator that simulates a device under test (DUT), and wherein the two devices are FPGAs which each simulate one or more functions of the DUT.

10. The method of claim 9, wherein the at least one signal hold stage added to the signal-receiving FPGA comprises the at least one pipeline stage removed from the signal-transmitting FPGA.

11. The method of claim 10, wherein the at least one signal hold stage is added to the signal-receiving FPGA between the de-multiplexer and the one or more pipeline stages of the signal-receiving FPGA.

12. The method of claim 8, wherein the removal of the at least one pipeline stage from the signal-transmitting one of the two devices and the addition of the at least one signal hold stage in a signal-receiving one of the two device decreases the total latency value by masking a latency associated with a link between the multiplexer and de-multiplexer.

13. A method for increasing a throughput of an electrical bus that connects at least two devices in a system, wherein an operating frequency of the two devices is a function of an operating frequency of the electrical bus divided by a total latency value, and wherein each of the two devices comprises a pipelined architecture with one or more pipeline stages for buffering signals, and the signal-transmitting one of the two devices comprises a multiplexer for multiplexing buffered signals from at least one pipeline stage to generate a multiplexed signal that is propagated over the electrical bus, and the signal-receiving one of the two devices comprises a de-multiplexer for de-multiplexing the multiplexed signal received over the electrical bus, the method comprising:
    removing at least one pipeline stage from the signal-transmitting one of the two devices; and
    adding at least one signal hold stage in a signal-receiving one of the two devices, such that the operating frequency of the two devices is increased, the total latency value is decreased, and a cycle-accuracy is maintained between the two devices with respect to state prior to the removal and addition steps and a state after the removal and addition steps;
    given that P is a number of signals to be routed from the signal-transmitting one of the two devices to the signal-receiving one of the two devices, C is a number of wires in the electrical bus, M is a multiplex ratio defined as M equals P divided by C, Ft is the operating frequency of the electrical bus, N is a number of cycles of the operating frequency Ft of the electrical bus needed for a signal to propagate from the signal-transmitting one of the two devices to the signal-receiving one of the two devices, B is a number of extra cycles of the operating frequency Ft of the electrical bus needed to compensate for clock phase differences between the signal-transmitting one of the two devices to the signal-receiving one of the two devices, and a maximum frequency Fs at which the two devices are operated is defined as Fs equals Ft divided by the sum of M, N and B, where M, N and B comprise the total latency value;

the removal of the at least one pipeline stage from the signal-transmitting one of the two devices and the addition of the at least one signal hold stage in a signal-receiving one of the two device decreases the total latency value by masking latencies attributable to N and B thereby increasing the maximum operating frequency Fs of the two devices and thus the throughput of the electrical bus.

14. The method of claim 8, wherein the system is a computer system, and wherein the two devices are integrated circuits on at least one printed circuit board of the computer system.

15. The method of claim 8, wherein the system is an integrated circuit, and wherein the two devices are circuit elements of the integrated circuit.

\* \* \* \* \*